United States Patent
Rojas Calvente et al.

(10) Patent No.: US 12,537,602 B2
(45) Date of Patent: Jan. 27, 2026

(54) OPTICAL WIRELESS COMMUNICATION TRANSCEIVER SYSTEM

(71) Applicant: SIGNIFY HOLDING B.V., Eindhoven (NL)

(72) Inventors: Francisco David Rojas Calvente, Eindhoven (NL); Paul Henricus Johannes Maria Van Voorthuisen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 275 days.

(21) Appl. No.: 18/557,321

(22) PCT Filed: Apr. 21, 2022

(86) PCT No.: PCT/EP2022/060539
§ 371 (c)(1),
(2) Date: Oct. 26, 2023

(87) PCT Pub. No.: WO2022/228987
PCT Pub. Date: Nov. 3, 2022

(65) Prior Publication Data
US 2024/0223281 A1   Jul. 4, 2024

(30) Foreign Application Priority Data

Apr. 29, 2021 (EP) .................................... 21171079
Dec. 7, 2021 (EP) .................................... 21212684

(51) Int. Cl.
*H04B 10/40* (2013.01)
*H04B 10/112* (2013.01)

(52) U.S. Cl.
CPC ......... *H04B 10/40* (2013.01); *H04B 10/1129* (2013.01)

(58) Field of Classification Search
CPC ............................. H04B 10/40; H04B 10/1129
(Continued)

(56) References Cited

U.S. PATENT DOCUMENTS 8,385,302 B2 * 2/2013 Jain ....................... H04W 48/12
                                                                370/338
8,938,164 B2 * 1/2015 Gao ...................... H04B 10/564
                                                                 398/16

(Continued)

FOREIGN PATENT DOCUMENTS

WO     2020053235 A1    3/2020

*Primary Examiner* — Dalzid E Singh (57) ABSTRACT

The invention relates to an Optical Wireless Communication, OWC, transceiver system (600), comprising: an optical receiver (102) with at least a photodetector and a Trans-Impedance Amplifier, TIA, for amplifying the signal from the at least one photodetector, and a two-dimensional array of optical transmitters (103a) each having an individual transmitter field-of-view, and corresponding drivers, the two-dimensional array arranged to create a combined transmitter field of view that is larger than the individual transmitter field of view, the plurality of optical transmitters arranged such that optical axes of the plurality of optical transmitters are evenly distributed within the combined transmitter field of view; a baseband unit (101) configured to modulate outgoing data for transmission and to demodulate incoming data of the optical receiver (102); a beacon generator configured to generate beacons for output by each respective one of the plurality of optical transmitters, wherein the beacon of a respective one of the plurality of optical transmitters comprises an attribute uniquely identifying the respective optical transmitter; a controller (209) configured, to select which of the plurality of optical transmitters in addition to its beacon also transmits the outgoing data.

15 Claims, 6 Drawing Sheets

(58) Field of Classification Search
USPC .......................................................... 398/135
See application file for complete search history.

(56) References Cited

U.S. PATENT DOCUMENTS

| | | | |
|---|---|---|---|
| 9,203,524 B2 | 12/2015 | Simpson et al. | |
| 10,097,264 B2* | 10/2018 | Venugopalan Nair Jalakumari .... | H04B 10/1143 |
| 10,236,986 B1 | 3/2019 | Shatz et al. | |
| 2019/0044616 A1 | 2/2019 | Laski et al. | |
| 2019/0082520 A1 | 3/2019 | Noshad et al. | |
| 2021/0344419 A1* | 11/2021 | Berner ................... | H04B 10/40 |
| 2024/0022325 A1* | 1/2024 | Khalid ............... | H04B 10/1123 |

* cited by examiner

OPTICAL WIRELESS COMMUNICATION TRANSCEIVER SYSTEM

CROSS-REFERENCE TO PRIOR APPLICATIONS

This application is the U.S. National Phase application under 35 U.S.C. § 371 of International Application No. PCT/EP2022/060539, filed on Apr. 21, 2022, which claims the benefit of European Patent Application No. 21171079.3, filed on Apr. 29, 2021 and European Patent Application No. 21212684.1, filed on Dec. 7, 2021. These applications are hereby incorporated by reference herein.

FIELD OF THE INVENTION

The invention relates to the field of Optical Wireless Communication (OWC) and more in particular to an OWC transceiver system, which may find exemplary use in vehicle-to-vehicle (V2V) networks or vehicle-to-infrastructure (V2I) networks, as well as methods and systems for use therein.

BACKGROUND OF THE INVENTION

Optical wireless communication enables mobile devices to connect wirelessly to one another using optical communication. In contrast to radio frequency communication OWC achieves this using the light spectrum which can enable unprecedented data transfer speed and bandwidth. Furthermore, it can be used in areas susceptible to electromagnetic interference and on account of the directional nature of light-based communication, is based on line-of-sight links. Optical communications may make use of either the visible or infrared spectrum. The advantage of using the infrared spectrum is that it is not immediately perceptible by humans. In contrast visible light when integrated in functional light may not be bothersome, but when used in horizontal communication, as for example when used between vehicles during the daytime, may be perceived as bothersome. In that case, use of infrared may be preferable.

Based on modulation data can be embedded in the light output and information in the optical communication signals can be detected using any suitable light sensor and corresponding demodulator. Photodetectors may be a dedicated photocell (point detector), or an array of photocells such as a camera.

Data may be modulated using a variety of modulation techniques ranging from simple Pulse Amplitude Modulation to Orthogonal Frequency Division Multiplex modulation. The latter has lately received considerable attention and various techniques may be used to address the fact that light in contrast to electrical signals requires a unipolar modulation. As a result, techniques such as ACO-OFDM and Flip OFDM have been devised in order to avoid having to add an offset to the light output.

Achieving a high data throughput and/or long range in a point-to-point OWC system, while maintaining a wide-angle coverage, is a challenge. This is not only because of the increased power requirements for the transmitter, but also because increasing the transmission power in optical systems above certain level is not always possible due to eye-safety requirements.

To address this problem, it is known to deploy electro-mechanical systems that are used to perform beam-steering. In such systems the output beam direction is adapted, under automated motor control. Know alternatives, instead use mechanical actuators in combination with mirrors for beam-steering. However, systems that use mechanical parts are expensive and prone to have reliability issues, especially in some common use cases of beam steering systems such as vehicle-to-vehicle communication.

SUMMARY OF THE INVENTION

The present invention proposes an alternative way to mechanical beam-steering, that does not use moving mechanical or electro-mechanical parts, and instead uses multiple narrow angle transmitters and a wide-angle receiver to perform beam selection.

In accordance with a first variant of the first aspect of the invention an Optical Wireless Communication, OWC, transceiver system is provided, comprising: an optical receiver with at least a photodetector and a Trans-Impedance Amplifier, TIA, for amplifying the signal from the at least one photodetector, and a two-dimensional array of optical transmitters each having an individual transmitter field-of-view, and corresponding drivers, the two-dimensional array arranged to create a combined transmitter field of view that is larger than the individual transmitter field of view, the plurality of optical transmitters arranged such that optical axes of the plurality of optical transmitters are evenly distributed within the combined transmitter field of view: a baseband unit configured to modulate outgoing data for transmission by the optical transmitters and to demodulate incoming data from the output of the transimpedance amplifier of the optical receiver: a beacon generator configured to generate beacons for output by each respective one of the plurality of optical transmitters, wherein the beacon of a respective one of the plurality of optical transmitters comprises an attribute uniquely identifying the respective optical transmitter and wherein the beacons are transmitted out-of-band from the outgoing data: and a controller configured, to detect a presence of an attribute of an optical transmitter from a potential communication partner in a beacon received at the OWC transceiver system in the output of the TIA: output feedback on the detected attribute in the beacons of all of the plurality of optical transmitters: and select which of the plurality of optical transmitters in addition to its beacon also transmits the outgoing data from the baseband unit.

In accordance with a second variant of the first aspect, the controller may take on more functions. In line therewith an Optical Wireless Communication, OWC, transceiver system is provided, comprising: an optical receiver with at least a photodetector and a Trans-Impedance Amplifier, TIA, for amplifying the signal from the at least one photodetector, and a two-dimensional array of optical transmitters each having an individual transmitter field-of-view; and corresponding drivers, the two-dimensional array arranged to create a combined transmitter field of view that is larger than the individual transmitter field of view; the plurality of optical transmitters arranged such that optical axes of the plurality of optical transmitters are evenly distributed within the combined transmitter field of view: a baseband unit configured to modulate outgoing data for transmission by the optical transmitters and to demodulate incoming data from the output of the transimpedance amplifier of the optical receiver, a controller configured to: generate a beacon for output by each respective one of the plurality of optical transmitters, wherein the beacon of a respective one of the plurality of optical transmitters comprises an attribute uniquely identifying the respective optical transmitter and wherein the beacons are transmitted out-of-band from the outgoing data; detect a presence of an attribute of an optical transmitter from a potential communication partner in a beacon received at the OWC transceiver system in the output of the TIA; output feedback on the detected attribute in the beacons of all of the plurality of optical transmitters: and select which of the plurality of optical transmitters in addition to its beacon also transmits the outgoing data from the baseband unit.

In accordance with the first and second variant of the first aspect an OWC transceiver system is provided that comprises an optical receiver and a two-dimensional array of optical transmitters.

The optical transmitters generally will be either Light Emitting Diodes (LEDs) or Vertical Cavity Surface Emitting Lasers (VCSELs). The photodetectors in turn may be photodiodes, such as Silicon Photon Multipliers (SiPMs) or Avalanche Photo Diodes (APDs).

The optical transmitters as described hereinbelow will typically be mounted on a substrate or PCB, where in certain implementations they may all be mounted on the same PCB. In this case the transmitters may be mounted on the same PCB at an angle (so as to effectuate the direction of their respective output emission) or they may be fitted with optical means, such as a waveguide and lens structure to couple out the light in a desirable direction. Alternatively, each transmitter may be mounted on a separate smaller PCB which is placed at an angle (so as to effectuate the beam-steering) at a distance from the main PCB.

The OWC transceiver system makes use of a two-dimensional array of optical transmitters that each output a beacon, wherein the beacon of a respective one of the plurality of optical transmitters comprises an attribute uniquely identifying the respective optical transmitter. To avoid issues with the beacons and outgoing data from interfering the beacons are transmitted out-of-band from the outgoing data.

When a remote OWC transceiver system receives such an optical transmitter output, it is possible to identify the optical transmitter(s) of the OWC transceiver that sent the signal and thus, which optical transmitter(s) is(/are) in a position to communicate with the remote OWC transceiver.

The remote OWC transceiver system may based thereon provide feedback on such detection to the OWC transceiver.

When the local OWC transceiver system receives an attribute of a remote OWC transceiver system, the local OWC transceiver system provides feedback to the remote OWC transceiver system. To this end the OWC transceiver system outputs feedback on the detected attribute in the beacons of all of the plurality of transmitters, using the out-of-band signaling channel. This feedback will in turn allow the remote transceiver to determine which of its optical transmitters to use to communicate with the OWC transceiver system.

Optionally, when multiple attributes are received from the remote OWC transceiver system at the OWC transceiver system, feedback may be provided on multiple detected attributes. For example, one could provide feedback for all those attributes that exceeded a certain signal strength threshold, or alternatively the two or three strongest attributes that exceeded a predetermined signal threshold.

The feedback is sent in the out-of-band channel, where the beacons are transmitted. When beacons have payload fields, the feedback could be provided in a payload field in the beacon, or when the beacon does not have payload fields, the feedback could be encoded in the beacon signal in another manner. For example, the beacon could be constructed to by default indicate that no signal was received and upon receipt, modify the beacon to encode the feedback, e.g. by inverting certain beacon sections. Alternatively, the beacon could be extended upon receipt to encode the feedback in the beacon.

More optionally a dedicated payload packet may be interleaved in between two beacons in the out-of-band channel used for beaconing to convey the feedback to the remote OWC transceiver. In either way, the remote OWC transceiver may be made aware of further transmit options, and may, when the link quality worsens, select another optical transmitter for which feedback was received for output of the outgoing data.

The OWC transceiver system in accordance with the first aspect is preferably used to communicate with another OWC transceiver system in accordance with the first aspect. In this manner each of the OWC transceiver systems can provide feedback on which optical transmitter the other OWC transceiver should use and can receive feedback on which optical transmitter it should use.

Optionally, at the expense of additional power dissipation, the outgoing data may be emitted on multiple optical transmitters for which feedback was received. In view of power dissipation, the number of simultaneously active transmitters should be restricted to a small subset, preferably a maximum of three optical transmitters. In case power is important, one could restrict it to, a maximum of two optical transmitters, representing the best and a backup.

In accordance with one option, the beacons may comprise CDMA codes for identifying the transmitter, where the CDMA codes correspond to the attributes detected. To provide feedback upon detection, the OWC transceiver system may temporarily replace the CDMA codes of all of the respective beacon outputs, with the inverted version of the CDMA code that was detected. When the remote OWC transceiver system observes this phenomenon, it will also detect the inverted CDMA code and thereby learn which of its optical transmitters can be received by the OWC transceiver system. When attributes are detected from multiple optical transmitters of the remote OWC transceiver system in the TIA output, the OWC transceiver system may sum the inverted CMDA codes received from the remote OWC transceiver and transmit the summed codes using the out-of-band signaling mechanism to the remote OWC transceiver. Because of the use of CDMA codes, the remote OWC transceiver system may still discern which inverted CDMA codes were embedded in the beacon output and thus learn which of its optical transmitters may be received by the OWC transceiver system and select one or more of those optical transmitters for outputting data.

In accordance with a first option of the variants of the first aspect, the OWC transceiver system is configured to: detect, in the output of the TIA, feedback on a detection from a communication partner on a unique attribute of an optical transmitter of the OWC transceiver system in a beacon from the OWC transceiver system: and select the optical transmitter corresponding to the unique attribute detected to transmit the outgoing data in addition to its beacon.

Thereby the OWC transceiver system may learn which optical transmitter was in a position to communicate with the remote OWC transceiver system and thus make sure that the main-channel output from the baseband unit is transmitted to the remote OWC transceiver system over the optical transmitter that was indicated in the feedback by the remote OWC system.

The attributes in question may be attributes of the "payload attributes", such as a plain identifier, or a code. The attributes be "message attributes" such as particular pilot frequencies, or combinations of pilot frequencies (for example using multi-tone code), or more alternatively combinations of payload and message attributes.

In accordance with a second option, the controller is configured to detect the feedback on the detection of a unique attribute of an optical transmitter. The latter is particularly useful if the feedback on the detection of a unique attribute is relatively simple as it allows for a more low-cost solution, attributing more functions to the controller. However, in case the controller would be overloaded, it may also be possible to utilize a separate feedback detector, that merely informs the controller about which unique attribute was received.

In accordance with a third option, it may be advantageous to select, in addition to the optical transmitter corresponding to the detected unique attribute, also its directly adjacent optical transmitters to transmit the outgoing data in addition to their respective beacons. In this manner, the ability to maintain a communication link is improved, at the cost of a possible higher optical output power, or a lower—per optical transmitter—optical output power when a fixed maximum optical output power needs to be adhered to.

The activation of a larger number of cells means that the likelihood of loss of signal is reduced.

In accordance with a fourth option, the OWC transceiver system is configured to: temporarily output the feedback on the detected attribute instead of the unique identifying information of the optical transmitters in the beacons of all of the plurality of optical transmitters and revert to transmitting the beacon of the respective one of the plurality of optical transmitters comprising the attribute uniquely identifying the respective optical transmitter.

In this manner not only the OWC transceiver system can adapt the selection of the optical transmitters that communicate data, but also a remote OWC transceiver system with which the OWC transceiver system communicates can select which of the optical transmitters to use to transmit data, in other words, which output beam(s) to select.

In accordance with a fifth option, the controller is configured to detect the presence of the attribute and control the temporary output of feedback and subsequent reversal to beaconing. In this manner a relatively low-cost solution may be obtained.

In accordance with a sixth option, the system comprises: one of a low-pass and a band-pass filter placed between the TIA output and the controller input for filtering out the main channel signal and passing out-of-band attribute signals. By means of the low-pass or band-pass filter, the processing at the controller can be simplified, as the main communication channel data already has been filtered, and operation which implies that the beacon/feedback signals would be outside of the frequency range used for the main communication channel.

In accordance with a seventh option, the detection is handled in a detector unit that communicates any detected attribute to the controller and the controller is configured to control the temporary output of feedback on the detected attribute. In this manner the workload of the controller can be reduced to handling events from the detector.

In accordance with an eight option, the attribute uniquely identifying the respective optical transmitter is one of: a predetermined CDMA code for a respective optical transmitter and a predetermined pilot tone for a respective optical transmitter. Both options represent an out-of-band beacons, that may be transmitted and detected in parallel with relatively little effort and that at the same time may also be used to provide feedback.

In line therewith in accordance with a nineth option, the feedback on an attribute uniquely identifying the respective optical transmitter is one of: a further CDMA code corresponding to a predetermined CDMA code of a respective optical transmitter and a further pilot tone corresponding to a predetermined pilot tone of a respective optical transmitter. The nature of the optical transmitter encoding may be standardized, predefined, or could be encoded during a commissioning process. If the format to the encoding is standardized, then there could easily be differences between the number of optical transmitters that respective OWC transceiver system have. As long as the receiver is arranged to detect the codes and/or frequencies and formats its reply in a likewise known format, it will be able to share the detection of beacon identifying attributes with the source.

At that point the OWC transceiver system that emitted the beacons, and which knows its own configuration, knows which of its optical transmitter(s) is/(are) most likely to result in a continued connection.

In accordance with a tenth option, the at least one optical receiver is mounted on a flat substrate with its optical axis with the optical axis of the combined transmitter field of view. The OWC transceiver system in accordance with the first aspect performs optical transmit beam selection. The optical receiver may be a relatively wide-angle receiver as compared to the individual transmitter field of view, preferably having a similar/same field-of-view similar or larger than the combined optical transmitter field-of-view. Although this is not a strict requirement, it does render the angles at which bi-direction communication is feasible more symmetrical.

In accordance with an eleventh option, the array of plurality of optical transmitters are arranged in a matrix along two orthogonal directions or in a hexagonal structure along two directions. Although the optical transmitters may be arranged in an orthogonal array/matrix, it may be beneficial to use a hexagonal structure instead of a square structure, as it allows for a reduced overlap.

In accordance with a second aspect, a vehicle is provided arranged for optical communication, the vehicle comprising: an in-vehicle network and, a first OWC transceiver system in accordance with the first aspect, comprising a forward-facing optical receiver, the forward-facing optical receiver's optical axis facing in the forward-motion direction of the vehicle, and wherein the in-vehicle network is connected to the OWC transceiver system.

In accordance with a first option of the second aspect the vehicle further comprises: a second OWC transceiver system comprising a backward facing optical receiver, the backward-facing optical receiver's optical axis facing opposite to the forward motion direction of the vehicle, and wherein the in-vehicle network is connected to the second OWC transceiver system.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1A:
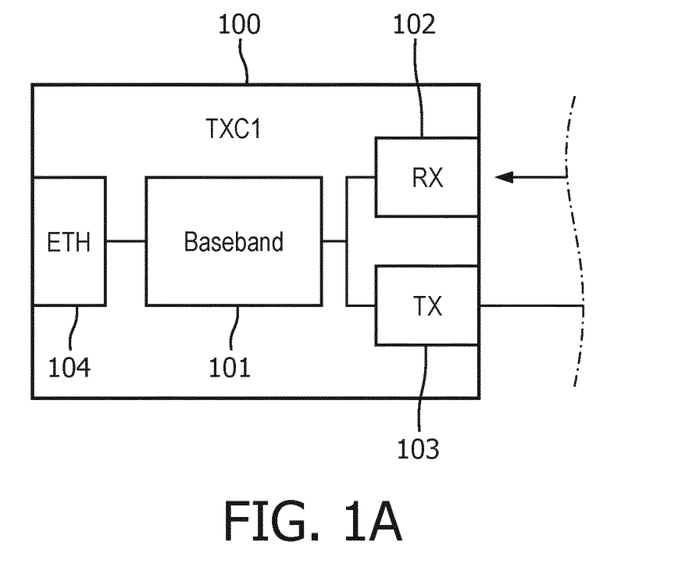
FIG. 1A and FIG. 1B, show respective elements of a system comprising two communicating point-to-point optical wireless transceiver systems.
Figure 1B:
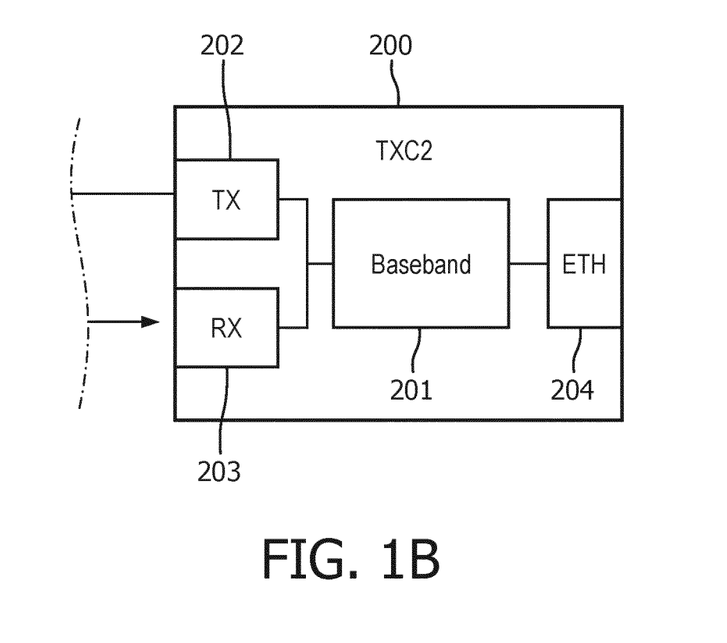

FIGS. 1A and 1B depict respectively one OWC transceiver arranged to communicate with one another using a point-to-point optical link. Each of the optical wireless systems, may be connected to a local network (such as an in-vehicle network), or other communication port (104, 204). Each of the OWC transceivers further comprises a baseband unit, which is configured to modulate and demodulate incoming and outgoing data signals in a bi-directional manner between the communication port and an optical transmitter (103, 202) and optical receiver (102, 203) of the respective optical front-end unit of the OWC transceivers.

In order for the system to establish a stable communication with maximum throughput, the transmitter of a unit (103) and its opposite receiver (203) on the other unit require aligned. If a transmitter and a receiver have different fields-of-view, also referred to as opening angles, it is sufficient for a good connection that the cones or beam patterns have substantial overlap. Generally, the more overlap the better the connection.

Figure 2A:
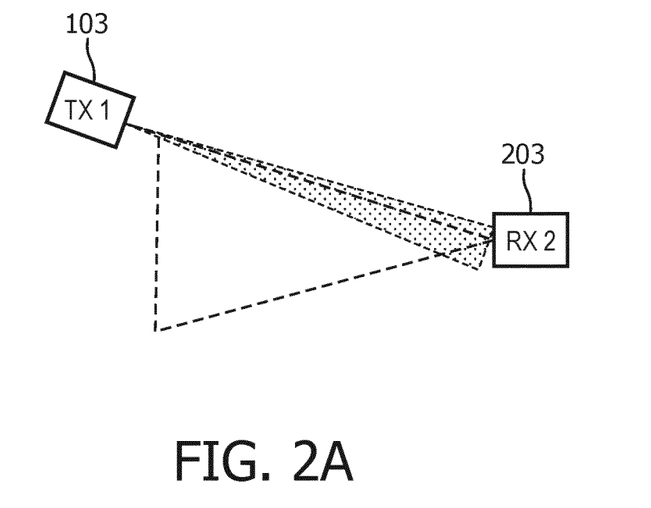
FIGS. 2A and 2B, illustrates the alignment of two point-to-point optical wireless transceiver systems.

In the case of a narrow angle transmitter and wide-angle receiver, the transmitter beam has to overlap at least partially the receiver beam close to the receiver source, as it is shown in FIG. 2A.

This allows for certain freedom of movement between the units, as perfect alignment is not necessary. The draw back is that for these wide-angle receivers the effective receiver sensor area is larger, therefore increasing the noise, resulting in less performance for the same received power. This can be partially compensated by adding multiple identical photo detectors, such as photodiodes, Silicon Photo Multipliers, or Avalanche Photo Diodes.

However, movement and therefore coverage area of the transceivers is still limited. Here, we propose for each transceiver system to have multiple narrow angle transmitters, composed of a separate optical emitter, lens, and amplifier, each one of them pointing in a different direction, and a single flat wide-angle receiver. All transmitters will be connectable to the single baseband output signal, where one or more of these transmitters can be activated at a time providing an output signal through the best aligned transmitter beam (or a combination of the best aligned ones).

Figure 2B:
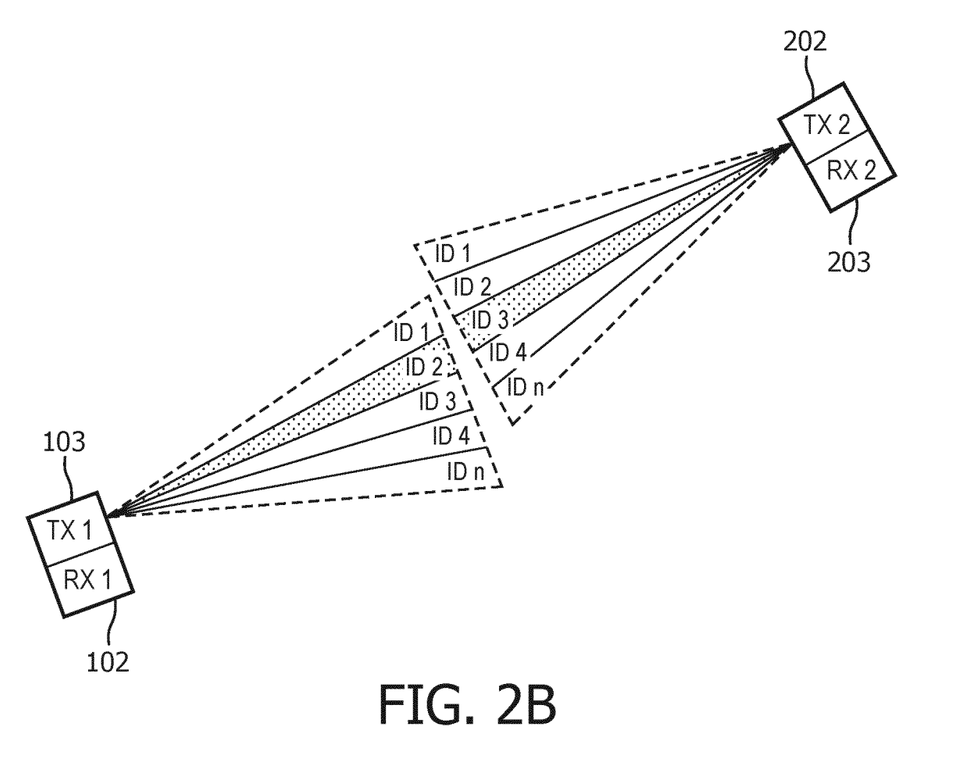

FIG. 2B shows this architecture used in a point-to-point system, with a different ID indicating a transmitter beam that points to a different direction. In this example, the transmitter unit 1 (103) selects the beam ID 2 as the strongest one, while due to the orientation, the transmitter unit 2 (202) selects the beam ID 3.

Both receivers (102, 203) have a receiving optical angle equal or larger than the combined transmission angle of all transmitter beams together. The solid cone of the receiver field of view is wider than the solid cone of the combined transmitter field of views.

To avoid a large drop in throughput when the systems are aligned exactly between two transmitter beams, all contiguous transmitter beams will need to have certain overlap (in this simple example ID 1 with ID2, ID 2 with ID 3, etc., but there can be more overlaps when the transmitters are oriented in a 3D space). The overlap area between two beams becomes larger the farther away the transceiver systems are, therefore, there will be an optimal distance range between systems where this solution is workable: beyond a certain distance, the overlap between two ID transmitted beams is so large that selection of a transmitter may become less useful, however, at that point the selection of a single beam means that the transmit power can remain optimized for nearby eye-safety.

Notably, below a minimum distance there would be no contiguous overlap anymore, creating dead zones. However, in the latter case, the relatively wide-angle receiver field of view may still allow for communication in spite of the no longer contiguous cones. In practical systems, such as for V2V communication, the minimum distance may be configured such that continuous communication is possible in realistic scenarios between like vehicles or assuming a known placement of the OWC transceivers. In practice, this could be in close proximity in a traffic jam, in the 1-to-5-meter range, or at a normal safe driving distance, which depends on the type of vehicle.

Figure 3A:
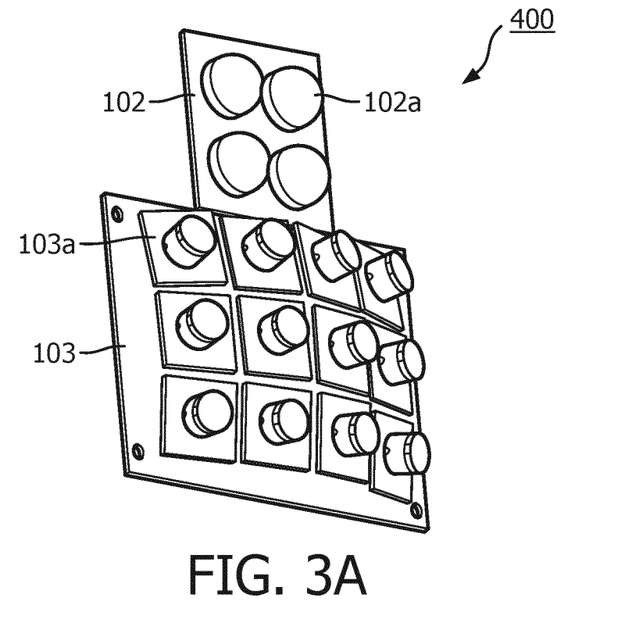
FIG. 3A shows a perspective view of an optical front-end unit.
Figure 3B:
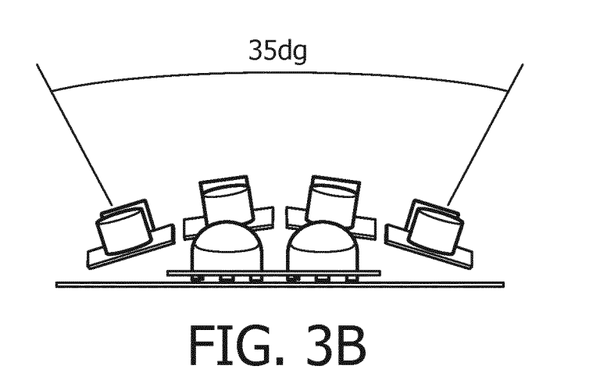
FIGS. 3B and 3C show a top and side view of the optical front-end unit respectively.
Figure 3C:
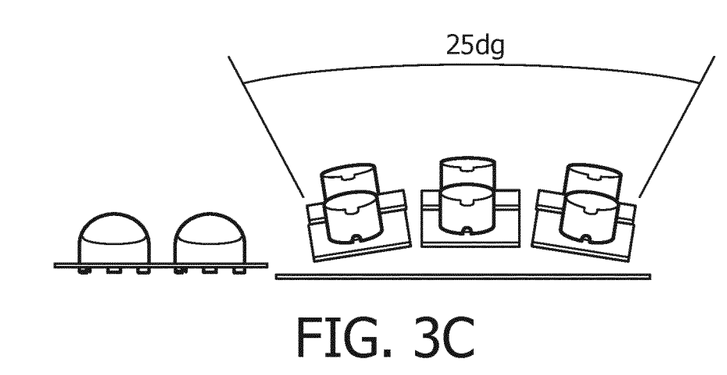

FIG. 3A shows an exemplary mechanical assembly of a perspective view of an optical front-end unit 400, FIGS. 3B and 3C show a corresponding top and side view of the optical front-end unit 400 respectively. In the exemplary mechanical arrangement of this OFE unit, provided is a common transmitter board (103), which includes a number of individual transmitters (103a . . . n), each of them mounted in separated boards which are mechanically assembled at an angle, to form an overall larger angle of coverage in both horizontal and vertical axis. The receiver board (102) is assembled flat, and it is composed of one or more wide-angle photodetectors (102a) and receiver circuits, all pointing to the same direction.

The optical front-end unit 400 includes a common transmitter board 103, which includes a number of individual transmitters 103a . . . n, each of them mounted on separated boards which are mechanically assembled at an angle, to form an overall larger angle of coverage in both horizontal and vertical direction. The driver(s) for the respective optical transmitters are not shown. The receiver board 102 is assembled flat, and it is composed of one or more wide-angle photodetectors 102a, all pointing in the same direction. The receiver board may include receiver circuits (not shown).

The depicted optical front-end has a 4×3 configuration of optical transmitters, resulting in a slightly wide horizontal field-of-view (35 degrees) than the vertical field-of-view (25 degrees). This is practical for vehicle-to-vehicle communication in view of the nature of traffic flow and the limitations of hill-climbing/descending capabilities of commercial vehicles.

The optical transmitters in turn may for example make use of VCSELs with appropriate optics to generate a wider field of view, or LEDs.

Figure 4A:
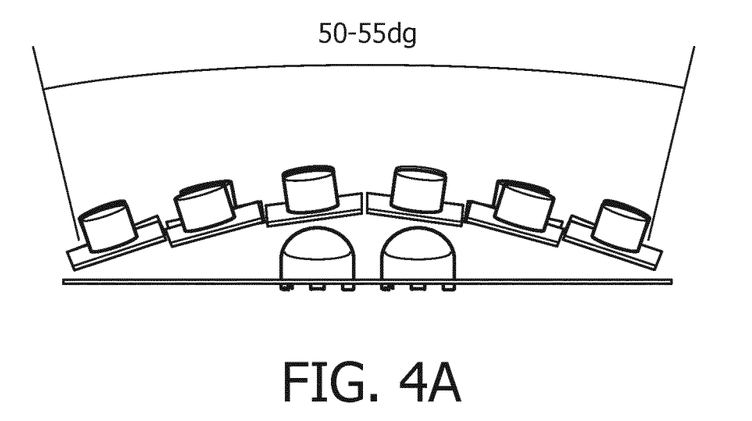
FIGS. 4A and 4B show a top and side view of a further optical front-end unit.
Figure 4B:
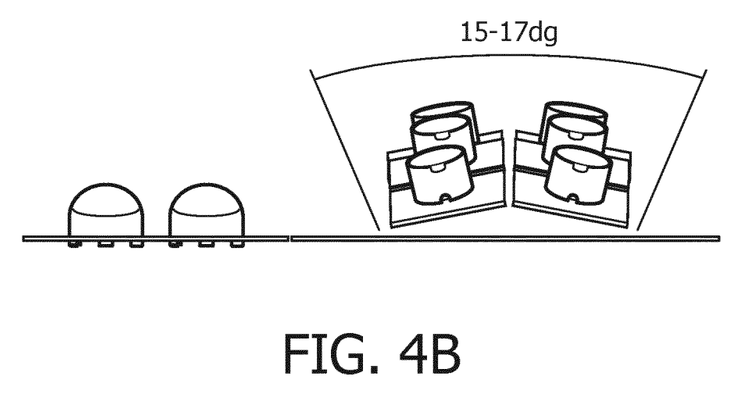

FIGS. 4A and 4B in turn depict a top and side view of another exemplary mechanical assembly of a perspective view of an optical front-end unit 400. In this case the optical front-end has a 6×2 configuration of optical transmitters, as a result the horizontal field of view is more pronounced, i.e. in the range of 50-55 degrees and the vertical field of view is 15-17 degrees.

As will be clear to those of ordinary skill the respective field of view will be dependent on the device optics fitted on the LED/VCSEL in question.

Figure 5A:
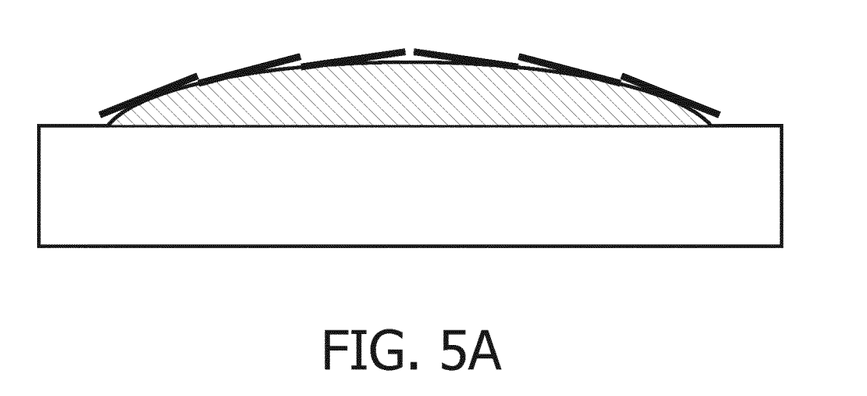
FIGS. 5A, 5B and 5C show schematic view of a cross-section of a transmitter array of an optical front-end unit.

FIG. 5A, shows a cross section along the horizontal axis of the top-view of FIG. 5A. It will be clear from this figure that the optical transmitters are placed on a curved surface, which in this cross-section is a flat curve, but which in case of the full three-dimensional surface that is curved around a first axis and curved around a second axis, the first and second axis orthogonal to one another, the first axis perpendicular to the first direction, the second axis perpendicular to the second direction.

Figure 5B:
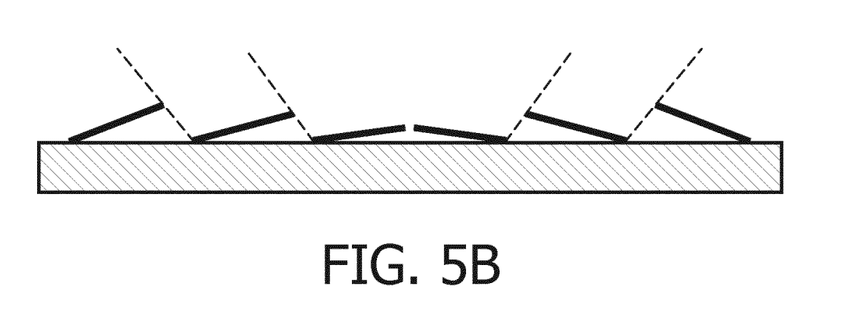

By placing the emitters on a surface as shown in FIG. 5A, the dead-zones between the emitters can be significantly reduced. However, as shown in FIG. 5B, alternative placements are envisaged. As shown in FIG. 5B, the transmitters may alternatively by placed with at least one point on a flat surface. In this case, it may be necessary to space apart some of the emitters, so as to prevent occlusion of the emissions from one of the emitters. In this manner the individual field of view of each transmitter can be exploited. This is strictly speaking not be necessary, as in case of occlusion, that segment of the combined transmission field of view would then be covered by the neighbouring device, however occlusions may result in abrupt changes of signal quality upon movement.

Figure 5C:
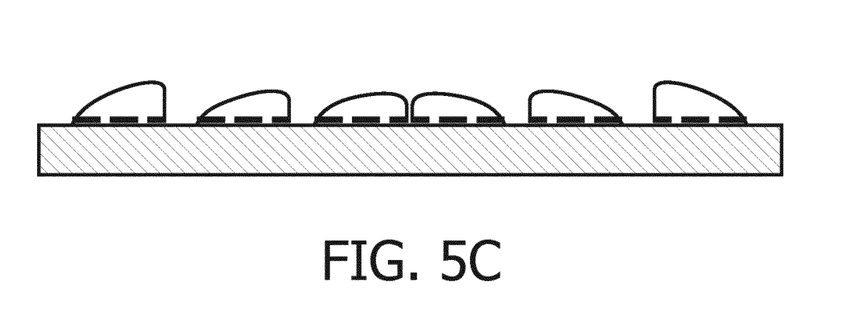

As shown in FIG. 5C a further refinement is possible by placement of the transmitter on a flat surface and provisioning of an optical waveguide with outcoupling, which allows all transmitters to be mounted on a flat substrate. Such an implementation may allow for a simpler, more conventional PCB assembly process, thereby saving cost.

Figure 6:
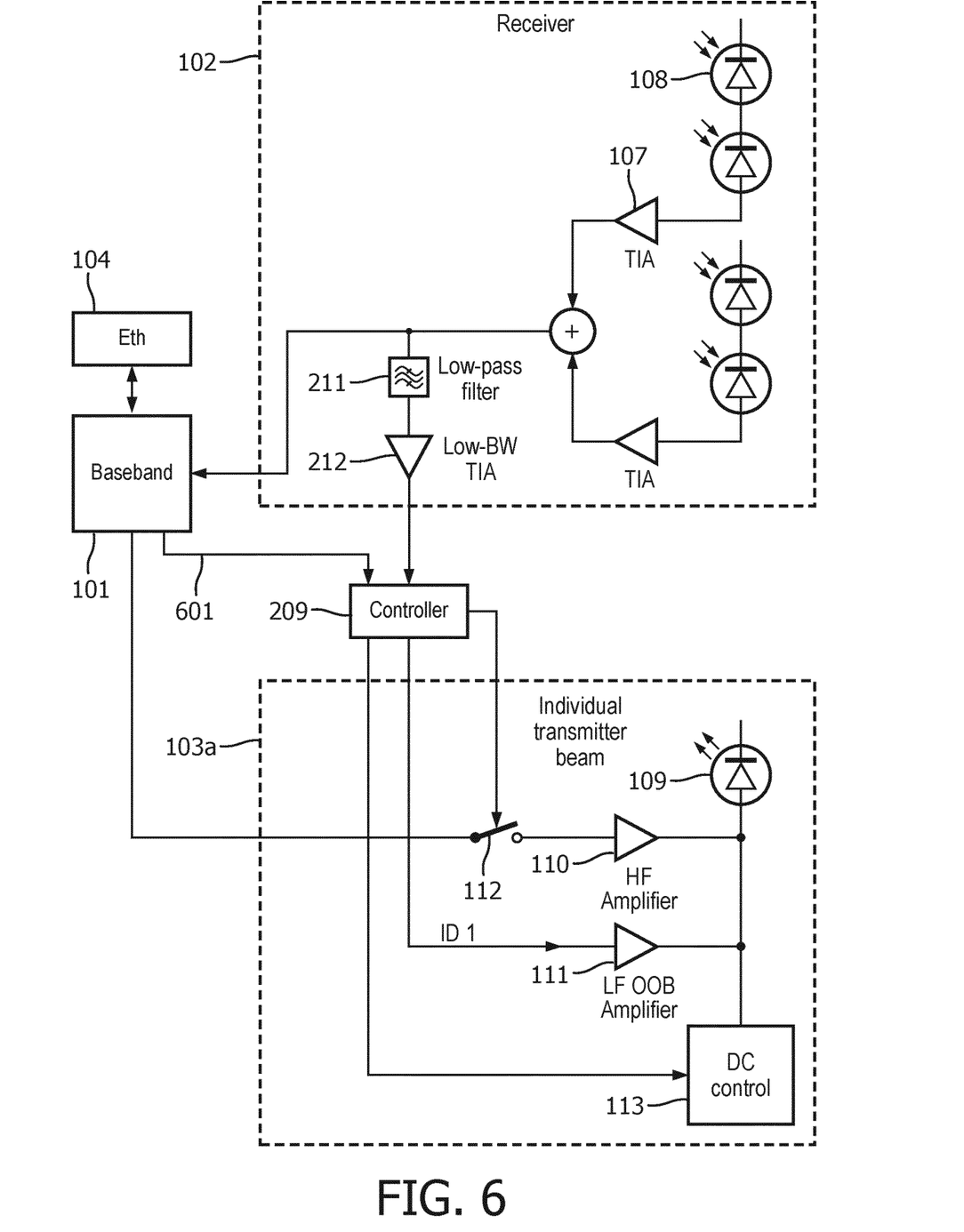
FIG. 6 shows a proposed transceiver with multiple out-of-band transmitters.

A more detailed diagram of the electronic/optics of the transceiver system proposed is shown in FIG. 6.

The transceiver system depicted there may be used for performing beam selection, in conjunction with a similar type of transceiver system (as discussed in relation to FIG. 2B). In a preferred embodiment, the transceiver may transmit out-of-band low-frequency CDMA beacons for use in beam selection. The CDMA beacons may be generated using dedicated hardware, or alternatively using a controller, when using the specific CDMA modulation as described in co-pending European patent application EP 21163846.5 that is hereby incorporated by reference.

In CDMA, binary bits are represented by (−1, +1). A message of length n' is spread by a code (chip sequence) of length N by multiplying each bit message for the full sequence. This generates a transmitted message of length n'×N. Each of the optical wireless transmitters uses a different chip sequence for encoding, which are statistically uncorrelated.

The chip time is constant, and it is the same for all chip sequences. When the encoded sequences are mixed in the overlapped area, the receiver can decode simultaneously the original messages of all transmitters by cross-correlating the received signal with the same N-chip sequences used for encoding the messages. This will produce a peak in the correlation when part of the signal matches a chip sequence. To simplify the system, for this specific case of beaconing we can use a different chip sequence to encode a single bit, producing messages of length N.

By using a different CDMA chip sequence per optical transmitter beam, which beams are partially overlapping, a receiving unit pointing to an area between two beams, thus will be in a position to detect the signal strength of each respective beam and thus may allow the receiving device to select the strongest one. CDMA beacons can make do with lower power than the main high-speed signal (in the order of 10-100 times less). As a result, usage of CDMA allows to have all transmitters transmit CDMA beacons continuously, while only the selected high-speed transmitter with the best orientation is connected to the output signal from the baseband unit 101.

The out-of-band (OOB) emitted beacons preferably use the same optical transmitters and receiver as the main optical signal. For the receiver 102, one or more photodiodes 108 receive the signal containing both the high-speed communication signal and the out-of-band signal (CDMA beacons), which is then amplified with one or more TIA 107 and then summed if required. The high-speed signal follows then the path to the input of the baseband unit 101, where the main channel signal is demodulated. To decode the OOB signal, a low-pass filter 211 is placed after the first amplification, and further amplified when required with an extra low-bandwidth TIA 212. After this, this signal is fed to a controller 209, where using an ADC (which can be internal or external) the signal is converted so as to enable digital signal processing.

For each of the selectable oriented beam transmitters 103a . . . n, the controller generates the OOB CDMA beacon which is amplified 111 and coupled to the light source 109, possibly together with the high-speed signal. To activate the selected high-speed beam transmitter, the controller needs to connect the path from the baseband to the high-frequency amplifier 110 by means of a switch 112 as well as change the DC current of the light source 113.

When CDMA is being used, it may be possible that the high-speed signal needs a much higher DC bias than the beacons, for this reason the DC control block 113 is provided. Each of the optical wireless transmitter blocks in turn generates a different OOB CDMA-based ID, each transmitter pointing to a different direction, as shown in FIG. 2B.

However, to be able to have one of the transceiver systems select the output beam to establish communication, the beacons which are continuously being sent by the first system 100 to the second system 200 need to be sent back to the first system 100 to inform this one of which is the better aligned transmitter at that moment (and vice versa from the second system to the first system). Therefore, the communication needs to be bi-directional but sufficiently fast, as some applications such as vehicle-to-vehicle communications need a fast response/reaction time.

A first mechanism proposed that allows fast beam selection, may be performed by the controller and transceiver system, is the following:

1. The first system 100, starts of continuously transmitting CDMA beacon, with each transmitter include a separate ID per orientation.
2. The first system 100, starts of to continuously receive (preferably in parallel) out-of-band signals (for example when present from the second system 200) and performing cross-correlations with all possible CDMA chip sequences: i.e. testing for all possible IDs.
3. The second system 200 is starts of performing the same steps 1 and 2.
4. If the first system 100's cross-correlations detect a high positive peak, then the OOB transmitter switches briefly to re-transmit that corresponding received beacon but with the CDMA sequence inverted, through all transmitters at the same time. This will at a receiver receiving the inverted signal, create a negative peak with the same magnitude when correlating with that CDMA sequence at the receiver. After a short period, the first system 100 reverts to step 1.

5. If the first system 100's cross-correlations detect a high negative peak, this means it is receiving an answer from the second system 200. In line therewith it connects the baseband system 101's output to the high-speed signal path (switch 112) for the transmitter corresponding with the ID of the detected inverted chip sequence.
6. The second system 200 in parallel performs the same steps 4 and 5 as the first system 100.

An alternative mechanism is proposed by using the invention in co-pending European patent application EP 21163846.5, in which the information of the received beacon can be embedded in the continuously transmitted beacon of step 1:

1. The first system 100 transmits continuously a different CDMA beacon (ID) per oriented beam transmitter.
2. The first system 100 continuously receives (in parallel) out-of-band signals and performs cross-correlations with all possible CDMA chip sequences of its communication partner (possible IDs).
3. The second system 200 preferably simultaneously performs the same steps 1 and 2.
4. The first system 100 performs cross-correlations to detect more than one high positive peak of the same beacon, then it counts the spacing between two consecutive peaks, which should always be N-chips. Then it:
    a. Modifies all different beacons sent in step 1 by adding an extra spacing to each beacon. The length of the spacing will be increment*num_detected_ID.
    b. Connects the path to the high-speed signal on the transmitter corresponding with the ID, which is decoded from the extra spacing counted between the two consecutive cross-correlation peaks.
5. The second system 200 in parallel performs the same step 4 as the first system 100.

With this method the reaction time can be faster, as the system is continuously transmitting in the same state, with each transmitter sending a different beacon, and the received beacon is encoded back in the extra spacing of all beacons.

A further improvement to the system can be to connect more than one high-speed transmitter path at the same time, which can be used for either increasing throughput by link aggregation or performing a smooth handover when switching between different beams.

Although the above implementation uses CDMA as an out-of-band signalling method, other out-of-band signalling methods are envisaged. A simple alternative is one wherein the first transceiver system transmits a different predetermined output beacon, in the form of a discrete pilot tone with a frequency $f_{1,1} \ldots f_{1,n}$ for n wireless optical transmitters facing in n orientations and wherein the frequencies $f_{1,1} \ldots f_{1,n}$ are outside the frequency band used for the main transmission.

In the above example, the second transceiver system analogous to the first method presented herein above, detect the presence of the respective sine-wave through simply bandpass filtering and pilot tone detection (e.g. using a Fourier analysis). When a pilot tone is detected and the second transceiver system, analogous to the example herein above, the second transceiver system may temporarily emit a different sine wave selected from the set $f_{2,1} \ldots f_{2,n}$ wherein $f_{2,x}$ is used to signal $f_{1,x}$ was received. After the brief intermezzo the second transceiver system may itself continue to emit the discrete pilot tone with a frequency $f_{1,1} \ldots f_{1,n}$ for n wireless optical transmitters facing in n orientations.

Similar to the situation herein above, both the first and the second transceiver system may thereby each inform the receiving party which of their transmitters is best suited and receive feedback from the receiving party allowing adaptation of the transmitter.

Summarizing in order to assist in output beam selection for a potential/current communication partner, each of the transceiver systems includes in its respective beacons information uniquely identifying the transmitter, information perceptible to a like transceiver system, which allows the like transceiver system to detect the uniquely identifying information and to temporarily switch from beaconing its own uniquely identifying transmitter information to conveying feedback by beaconing the received uniquely identifying transmitter information in a for the transceiver system discernible form, thereby allowing the transceiver system to select an appropriate transceiver system.

Also in this case it may be possible to activate more than one high-speed transmitter path at the same time, which can be used for either increasing throughput by link aggregation or performing a smooth handover when switching between different beams.

It will be clear to those skilled in the art that the codes, frequencies or other uniquely identifying transmitter information should be available at both communication partners and may for example use a predefined convention, may be standardized or set during a commissioning period allowing the communication partners to perform the beam selection task.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. An Optical Wireless Communication, OWC, transceiver system, comprising:
   an optical receiver with at least a photodetector and a Trans-Impedance Amplifier, TIA, for amplifying the signal from the at least one photodetector, and
   a two-dimensional array of optical transmitters each having an individual transmitter field-of-view, and corresponding drivers,
   the two-dimensional array arranged to create a combined transmitter field of view that is larger than the individual transmitter field of view, the plurality of optical transmitters arranged such that optical axes of the plurality of optical transmitters are evenly distributed within the combined transmitter field of view;
   a baseband unit configured to modulate outgoing data for transmission by the optical transmitters and to demodulate incoming data from the output of the transimpedance amplifier of the optical receiver;
   a beacon generator configured to generate beacons for output by each respective one of the plurality of optical transmitters, wherein the beacon of a respective one of the plurality of optical transmitters comprises an attribute uniquely identifying the respective optical transmitter and wherein the beacons are transmitted out-of-band from the outgoing data; and
   a controller configured to:
      detect a presence of a first attribute of an optical transmitter from a potential communication partner in a beacon received at the OWC transceiver system in the output of the TIA; output feedback on the detected first attribute in the beacons of all of the plurality of optical transmitters; and
      detect a presence of a second attribute of one of the plurality of optical transmitters of the OWC transceiver system in feedback from a potential communication partner in a beacon received at the OWC transceiver system in the output of the TIA; and
      select which subset of the plurality of optical transmitters in addition to its beacon also transmits the outgoing data from the baseband unit based on the second attribute.

2. The OWC transceiver system of claim 1, wherein the subset comprises
   the optical transmitter corresponding to the second attribute.

3. The OWC transceiver system of claim 2, wherein in addition to the optical transmitter corresponding to the second attribute also its directly adjacent optical transmitters are selected to transmit the outgoing data in addition to their respective beacons.

4. The OWC transceiver system of claim 1, wherein the beacons transmitted by the plurality of optical transmitters of the OWC transceiver system comprise one of:
   a payload field for providing feedback in the form of a detected attribute of the optical signal of an optical transmitter from a potential communication partner, which in the absence of detection indicates no beacon was received; and
   a payload field for providing feedback on multiple detected attributes of optical transmitters from a potential communication partner, which in the absence of detection indicates no beacon were received.

5. The OWC transceiver system of claim 1, wherein the OWC transceiver system is configured to:
   temporarily output the feedback on the first detected attribute instead of the attributes uniquely identifying the respective optical transmitters; and
   revert to transmitting the beacons of the respective ones of the plurality of optical transmitters comprising the attribute uniquely identifying the respective optical transmitter.

6. The OWC transceiver system of claim 5, wherein the controller is configured to detect the presence of the first attribute and control the temporary output of feedback and subsequent reversal to beaconing.

7. The OWC transceiver system of claim 1, the system comprising:
   one of a low-pass and a band-pass filter placed between the TIA output and the controller input for filtering out the main channel signal and passing out-of-band attribute signals.

8. The OWC transceiver system of claim 1, wherein the second attribute is one of:
   a predetermined CDMA code for a respective optical transmitter; and
   a predetermined pilot tone for a respective optical transmitter.

9. The OWC transceiver system of claim 1, wherein the feedback on the first attribute is one of:
   a further CDMA code corresponding to a predetermined CDMA code of a respective optical transmitter; and
   a further pilot tone corresponding to a predetermined pilot tone of a respective optical transmitter.

10. The OWC transceiver system of claim 1, wherein the at least one optical receiver is mounted on a flat substrate with its optical axis aligned with the optical axis of the combined transmitter field of view.

11. The OWC transceiver system of claim 1, wherein the array of plurality of optical transmitters are arranged in a matrix along two orthogonal directions or in a hexagonal structure along two directions.

12. A vehicle arranged for optical communication, the vehicle comprising:
   an in-vehicle network and,
   a first OWC transceiver system in accordance with claim 1, comprising a forward-facing optical receiver, the forward-facing optical receiver's optical axis facing in the forward motion direction of the vehicle, and wherein the in-vehicle network is connected to the OWC transceiver system.

13. The vehicle of claim 12, the vehicle further comprising:
   a second OWC transceiver system, comprising a backward facing optical receiver, the backward-facing optical receiver's optical axis facing opposite to the forward motion direction of the vehicle, and wherein the in-vehicle network is connected to the second OWC transceiver system.

14. The OWC transceiver system of claim 1, wherein the array of plurality of optical transmitters are mounted on a PCB at different angles so as to direct the output emissions and create the respective transmitter field-of-view for each of the plurality of optical transmitters.

15. An Optical Wireless Communication, OWC, transceiver system, comprising:
   an optical receiver with at least a photodetector and a Trans-Impedance Amplifier, TIA, for amplifying the signal from the at least one photodetector, and a two-dimensional array of optical transmitters each having an individual transmitter field-of-view, and corresponding drivers, the two-dimensional array arranged to create a combined transmitter field of view that is larger than the individual transmitter field of view, the plurality of optical transmitters arranged such that optical axes of the plurality of optical transmitters are evenly distributed within the combined transmitter field of view;

a baseband unit configured to modulate outgoing data for transmission by the optical transmitters and to demodulate incoming data from the output of the transimpedance amplifier of the optical receiver, a controller configured to:

generate a beacon for output by each respective one of the plurality of optical transmitters, wherein the beacon of a respective one of the plurality of optical transmitters comprises an attribute uniquely identifying the respective optical transmitter and wherein the beacons are transmitted out-of-band from the outgoing data;

detect a presence of a first attribute of an optical transmitter from a potential communication partner in a beacon received at the OWC transceiver system in the output of the TIA; and output feedback on the detected first attribute in the beacons of all of the plurality of optical transmitters; and detect a presence of a second attribute of one of the plurality of optical transmitters of the OWC transceiver system in the feedback from a potential communication partner in a beacon received at the OWC transceiver system in the output of the TIA; and select which subset of the plurality of optical transmitters in addition to its beacon also transmits the outgoing data from the baseband unit based on the second attribute.

* * * * *